(12) United States Patent
Chung et al.

(10) Patent No.: US 8,304,099 B2
(45) Date of Patent: Nov. 6, 2012

(54) TRANSPARENT HEAT SHIELDING MATERIAL, FABRICATION METHOD THEREOF AND TRANSPARENT HEAT SHIELDING STRUCTURE

(75) Inventors: Pao-Tang Chung, Hsinchu (TW); Sung-Jeng Jong, Pingtung Hsien (TW); Jer-Young Chern, Hsinchu (TW); Yih-Her Chang, Hsinchu (TW); Huai-Kuang Fu, Fengyuan (TW)

(73) Assignee: Industrial Technology Research Institute, Hsinchu County (TW)

( * ) Notice: Subject to any disclaimer, the term of this patent is extended or adjusted under 35 U.S.C. 154(b) by 267 days.

(21) Appl. No.: 12/749,927

(22) Filed: Mar. 30, 2010

(65) Prior Publication Data
US 2011/0143116 A1 Jun. 16, 2011

(30) Foreign Application Priority Data
Dec. 16, 2009 (TW) ................................ 98143078 A (51) Int. Cl.
*B32B 5/00* (2006.01)
*B32B 9/00* (2006.01)
*H01B 1/08* (2006.01)

(52) U.S. Cl. ........ 428/701; 428/696; 428/689; 428/702; 252/519.1; 977/775

(58) Field of Classification Search ........................ None
See application file for complete search history.

(56) References Cited

U.S. PATENT DOCUMENTS

| 3,457,106 A | 7/1969 | Gillery |
| 3,505,108 A | 4/1970 | Mochel |
| 3,912,524 A * | 10/1975 | Flannery et al. ................ 501/10 |
| 2006/0008640 A1 | 1/2006 | Chonan et al. |

FOREIGN PATENT DOCUMENTS

| AU | 34897/71 | | 5/1973 |
| CN | 1747908 A | | 3/2006 |
| JP | 2008214596 | * | 9/2008 |
| JP | 2008214596 A | | 9/2008 |

OTHER PUBLICATIONS

Pavlovski et al. Inorganic Materials, 2001, vol. 37, n8, pp. 846-848.*
Leitus et al., "Interplay of Cs concentration, dimensionality and superconductivity in CsxWO3", Physica C 371 (2002) 321-329, Elsevier.
Notification of first examination opinion issued by the China Intellectual Property Office on Jun. 29, 2012, for the above-referenced application's counterpart application in China (Application No. 201010112268.6).

* cited by examiner

*Primary Examiner* — Jennifer McNeil
*Assistant Examiner* — Vera Katz
(74) *Attorney, Agent, or Firm* — Pai Patent & Trademark Law Firm; Chao-Chang David Pai (57) ABSTRACT

A transparent heat shielding material, a fabrication method thereof and a transparent heat shielding structure are provided. The transparent heat shielding material is represented by $M_xWO_{3-y}A_y$, wherein M is at least one element of alkali metal, W is tungsten, O is oxygen, A is halogen, $0<x\leq1$, and $0<y\leq0.5$. The transparent heat shielding material $M_xWO_{3-y}A_y$ is formed from tungsten oxide with at least one alkali metal cation and halogen anion co-doping into. The transparent heat shielding structure includes one or more layers of a transparent heat shielding film, wherein the transparent heat shielding film includes the material $M_xWO_{3-y}A_y$.

25 Claims, 2 Drawing Sheets

TRANSPARENT HEAT SHIELDING MATERIAL, FABRICATION METHOD THEREOF AND TRANSPARENT HEAT SHIELDING STRUCTURE

CROSS REFERENCE TO RELATED APPLICATIONS

This Application claims priority of Taiwan Patent Application No. 98143078, filed on Dec. 16, 2009, the entirety of which is incorporated by reference herein.

BACKGROUND OF THE INVENTION

1. Field of the Invention

The invention relates to a transparent heat shielding material, and more particularly to a transparent heat shielding material formed from tungsten oxide with an anion and a cation co-doping.

2. Description of the Related Art

Generally, conventional heat shielding films are mainly made of multi-layered silver film. The fact that silver film is unstable in air is the major disadvantage of conventional heat shielding films. Additionally, conventional heat shielding films need to be formed from multi-layered film and by an expensive sputtering process, such that the fabrication cost of conventional heat shielding films is high.

Other conventional heat shielding films are made of electrically conductive material consisting of transparent oxides, such as antimony tin oxide (ATO) of $SnO_2$:Sb or indium tin oxide (ITO) of $SnO_2$: which has a plasma wavelength of about 1000 nm to 2500 nm. Because the conductivity of the conventional heat shielding film made of transparent conductive oxides is too low, the plasma wavelength thereof is greater than 1000 nm. Accordingly, a partial infrared light with a wavelength between 800 nm and 1000 nm passes through the conventional heat shielding film made of transparent conductive oxides, and the heat shielding function of the conventional heat shielding film is insufficient.

Moreover, another conventional heat shielding film can be made of lanthanum hexaboride ($LaB_6$) material with a plasma wavelength of 700 nm to 1100 nm. The conductivity of the conventional heat shielding film made of $LaB_6$ is high enough to shield against greater levels of infrared light. However, the conventional heat shielding film made of $LaB_6$ absorbs light in a visible light wavelength range such that the color of the conventional heat shielding film made of $LaB_6$ is too deep to satisfy the requirements of high transparency and high heat shielding capability of heat shielding films.

In addition, conventional transparent heat shielding films can be made of tungsten oxide with alkali metal element doping to shield against infrared light. However, while the visible light transmission of the conventional transparent heat shielding films made of tungsten oxide with alkali metal element doping is greater than 70%, the infrared light shielding ability thereof is poor. While the infrared light shielding ability of the conventional transparent heat shielding films made of tungsten oxide with alkali metal element doping is greater than 90%, the visible light transmission thereof is reduced below 70%. Accordingly, the conventional transparent heat shielding films made of tungsten oxide with alkali metal element doping can not achieve high visible light transmission and high infrared light shielding ability at the same time.

Therefore, a transparent heat shielding material, which can be used to form a transparent heat shielding film using a simple and low temperature coating process with a low fabrication cost, and satisfy the requirements of high visible light transmission, high heat shielding ability and high stability is desired.

BRIEF SUMMARY OF THE INVENTION

An embodiment of the invention provides a transparent heat shielding material. The transparent heat shielding material comprises tungsten oxide with at least one alkali metal and halogen co-doping is represented by Formula (I):

$$M_xWO_{3-y}A_y \quad \text{Formula (I),}$$

wherein M is at least one alkali metal element, W is tungsten, O is oxygen, A is halogen element, $0<x\leq1$, and $0<y\leq0.5$.

An embodiment of the invention provides a method for forming a transparent heat shielding. The method comprises providing a precursor for forming tungsten oxide. Next, a halogen salt and an alkali metal salt are provided for mixing with the precursor for forming tungsten oxide to form a mixture, wherein the halogen salt has a halogen anion and the alkali metal salt has at least one alkali metal cation. Then, a reduction reaction is applied to the mixture in a hydrogen environment to form a material of $M_xWO_{3-y}A_y$, represented by Formula (I), which is tungsten oxide with the at least one alkali metal cation and the halogen anion co-doping, and wherein M is at least one alkali metal element, W is tungsten, O is oxygen, A is halogen element, $0<x\leq1$, and $0<y\leq0.5$.

Further, an embodiment of the invention provides a transparent heat shielding structure. The transparent heat shielding structure comprises one or more layers of a transparent heat shielding film, wherein the transparent heat shielding film includes a material $M_xWO_{3-y}A_y$, represented by Formula (I), which is tungsten oxide with at least one alkali metal cation and a halogen anion co-doping, and wherein M is at least one alkali metal element, W is tungsten, O is oxygen, A is halogen element, $0<x\leq1$, and $0<y\leq0.5$.

A detailed description is given in the following embodiments with reference to the accompanying drawings.

BRIEF DESCRIPTION OF THE DRAWINGS

The invention can be more fully understood by reading the subsequent detailed description and Examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

An embodiment of the invention provides a transparent heat shielding material of $M_xWO_{3-y}A_y$, represented by Formula (I) to form a transparent heat shielding film, wherein M is at least one alkali metal element, including lithium (Li), sodium (Na), potassium (K), rubidium (Rb), cesium (Cs) or combinations thereof; W is tungsten; O is oxygen; A is halogen element, including fluorine (F), chlorine (Cl), bromine (Br) or iodine (I) and wherein chlorine (Cl) is preferred; $0<x\leq1$; and $0<y\leq0.5$. The transparent heat shielding material $M_xWO_{3-y}A_y$ is tungsten oxide with at least one alkali metal cation and a halogen anion co-doping, which has a plasma wavelength of 800 nm to 1000 nm. The electrical conductivity of the transparent heat shielding material is good and the transparent heat shielding material does not absorb light in a wavelength range of visible light, such that the transparent heat shielding film thereof can achieve high transparency and high heat shielding ability.

In addition, an embodiment of the invention provides a method for forming the transparent heat shielding material $M_xWO_{3-y}A_y$. In one embodiment, tungsten oxide is synthesized in a liquid system, and then an alkali metal salt of suitable ratio and a halogen salt of suitable ratio are provided to add to the liquid system to form a mixture. Then, after removing the solvent of the liquid system, the mixture is heated at a temperature of 300° C. to 800° C. to perform a reduction reaction in a hydrogen environment to form the transparent heat shielding material of $M_xWO_{3-y}A_y$.

In one embodiment, the transparent heat shielding material of $M_xWO_{3-y}A_y$ is formed in a solid system. First, tungsten oxide or a precursor or a salt for forming tungsten oxide is provided in the solid system. Then, an alkali metal salt of suitable ratio and a halogen salt of suitable ratio are provided to add into the solid system to form a mixture. Next, the mixture is heated at a temperature of 300° C. to 800° C. to perform a reduction reaction in a hydrogen environment to form the transparent heat shielding material of $M_xWO_{3-y}A_y$.

In addition, an embodiment of the invention provides a transparent heat shielding film. In one embodiment, after a precursor of forming tungsten oxide is mixed with an alkali metal salt and a halogen salt to form a mixture, the mixture is directly coated on a substrate to form an inorganic continuous transparent heat shielding film of $M_xWO_{3-y}A_y$.

In one embodiment, the transparent heat shielding material $M_xWO_{3-y}A_y$ can be blended or polymerized with a polymer and then directly processed to form a transparent heat shielding film. The polymer may be polyesters, polyimide resins, acrylic resins, epoxy resins, silicone resins, phenoxy resins, polyurethane resins, urea resins, acrylonitrile butadiene styrene (ABS) resins, polyvinyl butyral (PVB) resins, polyether resins, fluorine-containing resins, polycarbonate, polystyrene, polyamide, starch, cellulose, copolymers thereof, or mixtures thereof.

In one embodiment, the alkali metal salt and the halogen salt can be respectively added by a form of solution into a solution of the precursor of forming tungsten oxide. Accordingly, the processes of doping the alkali metal cation and doping the halogen anion can be implemented respectively. Thus, the materials of $M_xWO_{3-y}A_y$ with the same or different doping ratios of the alkali metal cation and the halogen anion can be achieved through adjusting the amounts of the alkali metal salt and the halogen salt.

In one embodiment, the halogen element of the material of $M_xWO_{3-y}A_y$ can be further provided from the precursors of tungsten oxide and/or the alkali metal salt.

The alkali metal salt can be represented by the formula $M_pN$, wherein M is an alkali metal element selected from the group consisting of lithium (Li), sodium (Na), potassium (K), rubidium (Rb) and cesium (Cs), N is an anion or an anion group with negative valence, and $1\leq p\leq 12$. The alkali metal salt $M_pN$ may be at least one kind of salt selected from the group consisting of alkali metal carbonates, alkali metal hydrogen carbonates, alkali metal nitrates, alkali metal nitrites, alkali metal hydroxides, alkali metal halides, alkali metal sulfates, alkali metal sulfites, and other salts containing alkali metal.

The halogen salt can be represented by the formula $PA_q$, wherein A is halogen element including fluorine (F), chlorine (Cl), bromine (Br) or iodine (I), P is a cation or a cation group with positive valence, and $1\leq q\leq 12$. The halogen salt can be composed of ammonium halides, alkylammonium salts, halocarbons, hydrogen halides, tungsten halides, benzene halides, halogenated aromatics, alkyl halides and other salts containing halogen.

The precursor of forming tungsten oxide may be ammonium metatungstate, ammonium orthotungstate, ammonium paratungstate, alkali metal tungstates, tungstic acid, tungsten silicides, tungsten sulfides, tungsten oxychlorides, tungsten alkoxide, tungsten hexachloride, tungsten tetrachloride, tungsten bromides, tungsten fluorides, tungsten carbides, tungsten oxycarbides and other salts containing tungsten.

When the transparent heat shielding material $M_xWO_{3-y}A_y$ is preliminarily processed into a form of powder, the powder $M_xWO_{3-y}A_y$ can be further processed by a milling process to form a powder $M_xWO_{3-y}A_y$ with a diameter smaller than 100 nm. During the milling process, a small amount of inorganic metal oxides such as silicon oxides, zirconium oxides, titanium oxides, aluminum oxide or combinations thereof can be added to the powder $M_xWO_{3-y}A_y$ for covering the surface thereof to protect the powder of $M_xWO_{3-y}A_y$ from aggregating or from causing surface property changes. Besides, a small amount of silane, tilane or an organic-metallic functional group can be added to the powder $M_xWO_{3-y}A_y$ for modifying the surface thereof to improve the compatibility of the powder $M_xWO_{3-y}A_y$ with an organic solvent or a resin. The powder $M_xWO_{3-y}A_y$ can be used alone or with a binder to form a transparent heat shielding film. In one embodiment, the powder of $M_xWO_{3-y}A_y$ is dispersed in a solvent by a suitable dispersant to form a nanometer scale dispersion solution of the transparent heat shielding material. Then, the nanometer scale dispersion solution of the transparent heat shielding material is coated on a transparent substrate by a wet coating method and dried to form a transparent heat shielding film.

In one embodiment, the dispersion solution of the transparent heat shielding material $M_xWO_{3-y}A_y$ can be further combined with a binder to form a transparent heat shielding coating solution. Then, the transparent heat shielding coating solution is coated on a transparent substrate by a wet coating method and dried to form a transparent heat shielding film. In an embodiment of the invention, the transparent heat shielding material $M_xWO_{3-y}A_y$ is about 1 to 99 percent by weight in the transparent heat shielding film containing the transparent heat shielding material of $M_xWO_{3-y}A_y$ and the binder.

The dispersant used in the dispersion solution of the transparent heat shielding material may be a polymeric dispersant, for example, high molecular weight copolymers of salts of polyamine amides and polyesters, unsaturated polyamine amides, or inorganic acid ester salts. The solvent used in the dispersion solution can be selected from the group consisting of, but not limited to, water, methanol, ethanol, n-butanol, isopropanol, cyclohexanone, methyl ethyl ketone, methyl isobutyl ketone, ethyl ether, ethylene glycol ethers such as ethylene glycol dimethyl ether, and ethylene glycol monoethyl ether, tetrahydrofuran (THF), propylene glycol monomethyl ether acetate (PGMEA), ethyl-2-ethoxyethyl acetate, 3-ethoxyethyl propionate, isoamyl acetate, chloroform, n-hexane, heptane, pentane, benzene, toluene, xylene, cyclohexane, and the like.

The binder used in the transparent heat shielding coating solution may be organic binders, inorganic binders or pressure sensitive adhesives. The organic binder can be selected from the group consisting of, but not limited to, acrylic resins, epoxy resins, silicone resins, phenoxy resins, polyurethane resins, urea resins, acrylonitrile butadiene styrene (ABS) resins, polyvinyl butyral (PVB) resins, polyether resins, fluorine-containing resins, polycarbonate, polystyrene, polyamide, starch, cellulose, copolymers thereof, and mixtures thereof. The inorganic binder can be selected from the group consisting of, but not limited to, silicon tetraethoxide (TEOS), aluminum triisopropoxide, zirconium tetrabutoxide, and titanium tetraisopropoxide.

The suitable wet coating methods for forming the transparent heat shielding films include, but are not limited to; spin coating, casting, bar coating, blade coating, roller coating, wire bar coating, and dip coating. The transparent substrate may be glass, transparent resins or combinations thereof. The transparent resins are for example poly(ethylene terephthalate) (PET), polycarbonate (PC), acrylic resins, polypropylene, polyethylene, polystyrene, polyvinyl chloride, or the like.

In embodiments of the invention, one or more layers of transparent heat shielding film can be coated on the transparent substrate to form a transparent heat shielding structure. In the transparent heat shielding structure, the layers of transparent heat shielding films may have different compositions of the transparent heat shielding material $M_xWO_{3-y}A_y$, such that the visible light transmission and the infrared light shielding ratio of the transparent heat shielding structure can be adjusted through the composition of the transparent heat shielding material of $M_xWO_{3-y}A_y$ in the layers of transparent heat shielding films. Moreover, transparent heat shielding structures can be formed from a plurality of layers of transparent heat shielding films with different thicknesses and different amounts of the transparent heat shielding material of $M_xWO_{3-y}A_y$ to adjust the light transmission and the heat shielding ability of the transparent heat shielding structures. In one embodiment of the invention, each layer of the transparent heat shielding films may have a thickness of about 1 μm to about 100 μm.

The visible light transmission and the infrared light transmission mentioned in the embodiments of the invention are both obtained from integral values of (spectrum strength*sunlight strength distribution) to wavelength in ultraviolet-visible-infrared light (UV-VIS-IR) spectrums. The calculating range of the integral values is defined according to the spectrum range defined by ISO9050 and cooperates with the detection limit of the instruments. The calculating range of the visible light transmission is 380-780 nm, and the calculating range of the infrared light transmission is 780-2000 nm. The infrared light shielding ratio is equal to deduct the infrared light transmission from 100%, i.e. the infrared light shielding ratio=100%−the infrared light transmission. The infrared light shielding ratio is the ratio of the infrared light which cannot pass through the transparent heat shielding structures to the initial infrared light into the transparent heat shielding structures. In the embodiments of the invention, the transparent heat shielding structures have high transparency and high heat shielding ability. In the preferred embodiments, the visible light transmissions of the transparent heat shielding structures are greater than about 70%, and the infrared light shielding ratios thereof are greater than about 90%. While comparing the transparent heat shielding films of the invention containing the transparent heat shielding material $M_xWO_{3-y}A_y$ with the conventional transparent heat shielding films containing un-doped tungsten oxide or tungsten oxide with metal ion doping, the transparent heat shielding films of the invention can enhance heat shielding ability and maintain the same level of visible light transmission as the conventional transparent heat shielding films. The increment of the infrared light shielding ratio is about 6% to about 10%. Therefore, the transparent heat shielding films of the invention can satisfy the requirements of high visible light transmission and high heat shielding ability at the same time.

The fabrication methods and the characters of the transparent heat shielding materials and the transparent heat shielding films of the invention are described in detail by several Examples and Comparative Examples below:

Comparative Example 1

Fabricating a Heat Shielding Material with a Mole Ratio of Cs:W=0.33:1 and a Transparent Heat Shielding Film Thereof Ammonium metatungstate (produced by SHOWA company) of 10 g was added to water to provide a 30 weight percent solution and was thoroughly mixed to provide a transparent solution A. Cesium carbonate (produced by Alfa Aesar company) of 2.2 g was added to water to provide a 50 weight percent solution and was thoroughly mixed to provide a transparent solution B. Then, the transparent solution B was slowly dripped into the transparent solution A while stirring the transparent solution A at the same to form a transparent mixing solution C. The transparent mixing solution C was baked at a temperature of 145° C. to form an initial product of powder. Then, the initial product was heated at a temperature of 550° C. for 20 minutes in a hydrogen environment of 10 percent by volume (vol %) to perform a reduction reaction to form a powdered product P of a heat shielding material with a mole ratio of Cs:W=0.33:1.

Figure 1:
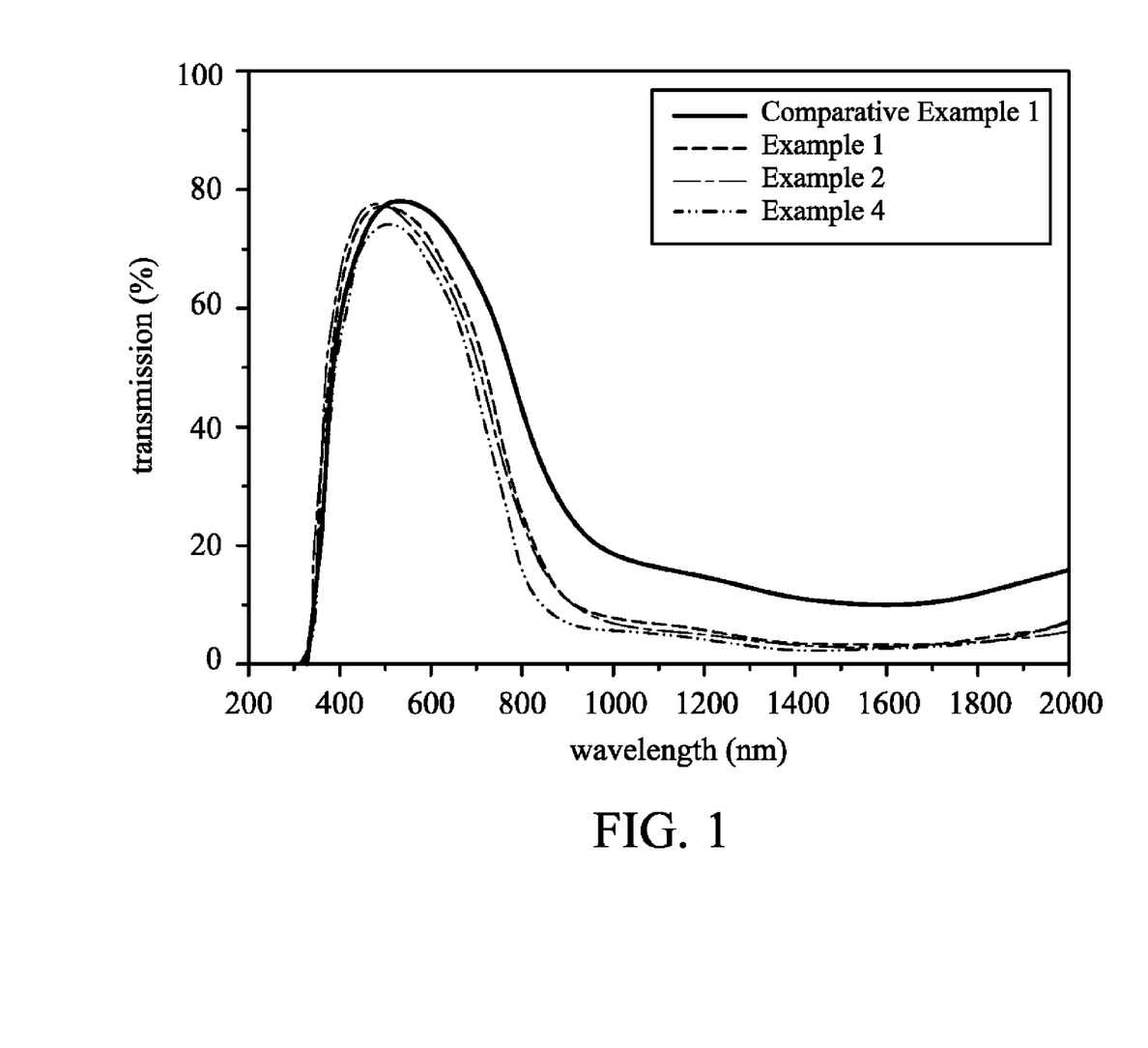
FIG. 1 shows an ultraviolet-visible-infrared light (UV-VIS-IR) spectrum of the transparent heat shielding films according to the Comparative Example 1 and the Examples 1, 2 and 4 of the invention.
Figure 2:
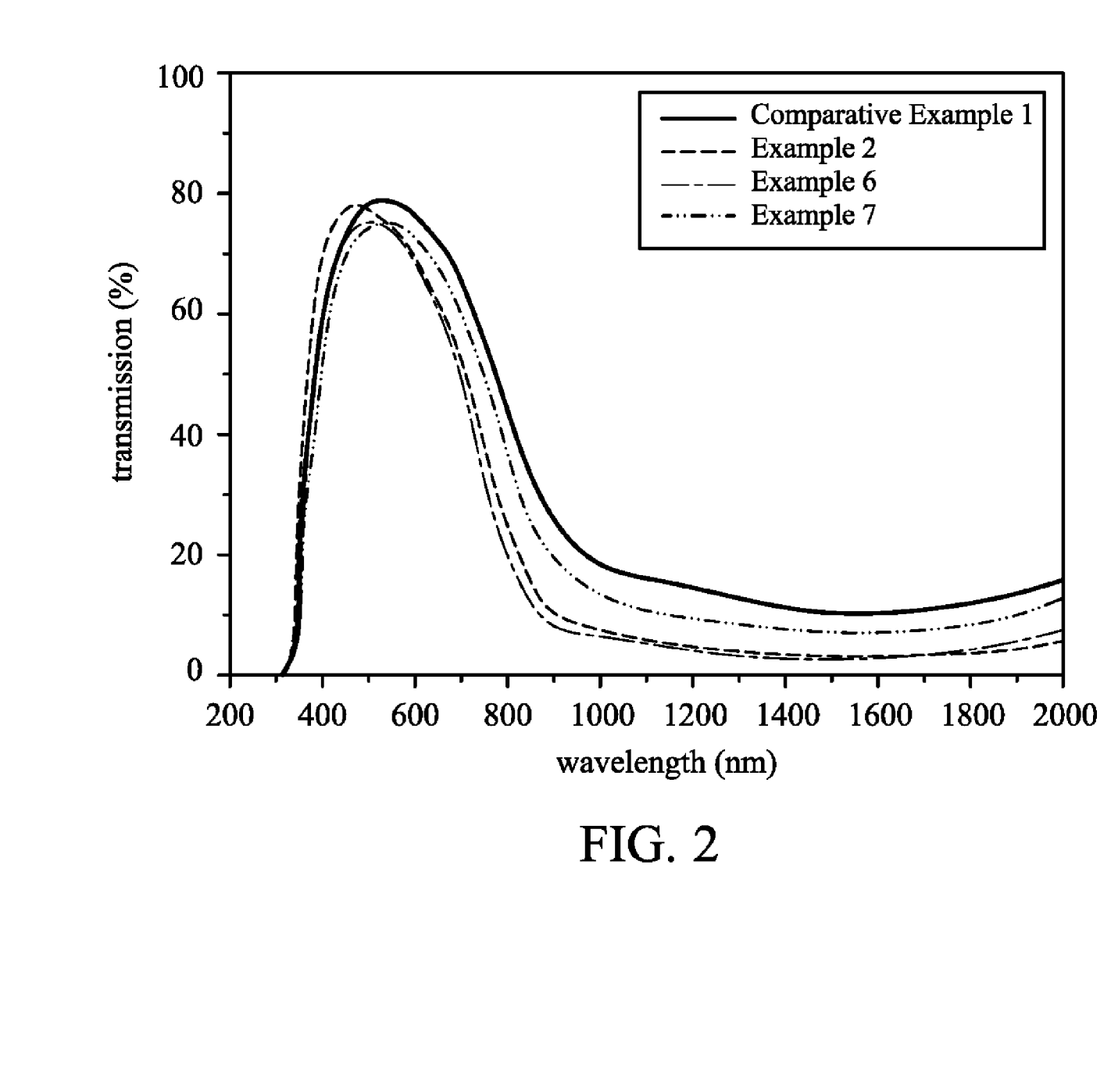
FIG. 2 shows an ultraviolet-visible-infrared light (UV-VIS-IR) spectrum of the transparent heat shielding films according to the Comparative Example 1 and the Examples 2, 6 and 7 of the invention.

Next, the powdered product P of the heat shielding material was added to a solvent of toluene to provide a 10 weight percent solution, followed by addition of 40 weight percent of a polymeric dispersant, based on the weight of the powdered product P of the heat shielding material. The resulting mixture was ball milled by yttrium-stabilized $ZrO_2$ balls (diameter 2 mm) to produce a nanometer scale dispersed suspension D. Then, the dispersed suspension D was added to acrylic resin (product number of ACRYDIC A-0157 by Lidye Chemical Co., Ltd.) an thoroughly mixed to provide a 30 weight percent coating solution E. The coating solution E was then coated on a glass plate by a wet coating method, baked at 80° C. for a half hour to provide a 30 μm-thick transparent heat shielding film. The ultraviolet-visible-infrared light (UV-VIS-IR) spectrum of the transparent heat shielding film was measured and the results are shown in FIG. 1, FIG. 2 and Table 1. The transparent heat shielding film of the Comparative Example 1 exhibited a heat shielding index ((Tvis+Rir)*100) of 151.

Example 1

Fabricating a Heat Shielding Material with a Mole Ratio of Cs:W:Cl=0.33:1:0.03 and a Transparent Heat Shielding Film Thereof Ammonium metatungstate (produced by SHOWA company) of 10 g was added to water to provide a 30 weight percent solution and was thoroughly mixed to provide a transparent solution A1. Ammonium chloride (produced by SHOWA company) of 0.07 g was added to the transparent solution A1, an thoroughly mixed to provide a transparent solution A1'. Cesium carbonate (produced by Alfa Aesar company) of 2.2 g was added to water to provide a 50 weight percent solution and was thoroughly mixed to provide a transparent solution B1. Then, the transparent solution B1 was slowly dripped into the transparent solution A1' while stirring the transparent solution A1' at the same time to form a transparent mixing solution C1. The transparent mixing solution C1 was baked at a temperature of 145° C. to form an initial product in the form of powder. Then, the initial product was heated at a temperature of 550° C. for 20 minutes in a hydrogen environment of 10 vol % to perform a reduction reaction to form a heat shielding powdered product P1 with a mole ratio of Cs:W:Cl=0.33:1:0.03.

The heat shielding powdered product P1 of the Example 1 was measured by a X-ray photoelectron spectrometer (XPS) and the result shows the heat shielding powdered product P1 of the Example 1 with a mole ratio of Cs:W:Cl=0.33:1:0.03 having chlorine doping, wherein the chlorine doping amount was about 0.96 mole % based on the tungsten doping amount.

Next, the heat shielding powdered product P1 was added to a solvent of toluene to provide a 10 weight percent solution, followed by addition of a 40 weight percent of a polymeric dispersant, based on the weight of the heat shielding powdered product P1. The resulting mixture was a ball milled by yttrium-stabilized $ZrO_2$ balls (diameter 2 mm) to produce a nanometer scale dispersed suspension D1. Then, the dispersed suspension D1 was added to acrylic resin (product number of ACRYDIC A-0157 by Lidye Chemical Co., Ltd.) an thoroughly mixed to provide a 30 weight percent coating solution E1. The coating solution E1 was then coated on a glass plate by a wet coating method, baked at 80° C. for a half hour to provide a 30 μm-thick transparent heat shielding film. The UV-VIS-IR spectrum of the transparent heat shielding film was measured and the results are shown in FIG. 1 and Table 1. The transparent heat shielding film of the Example 1 exhibited a heat shielding index ((Tvis+Rir)*100) of 160.

Example 2

Fabricating a Heat Shielding Material with a Mole Ratio of Cs:W:Cl=0.33:1:0.05 and a Transparent Heat Shielding Film Thereof Ammonium metatungstate (produced by SHOWA company) of 10 g was added to water to provide a 30 weight percent solution and was thoroughly mixed to provide a transparent solution A2. Ammonium chloride (produced by SHOWA company) of 0.11 g was added to the transparent solution A2, an thoroughly mixed to provide a transparent solution A2'. 2.2 g of Cesium carbonate (produced by Alfa Aesar company) was added to water to provide a 50 weight percent solution and was thoroughly mixed to provide a transparent solution B2. Then, the transparent solution B2 was slowly dripped into the transparent solution A2' while stirring the transparent solution A2' at the same time to form a transparent mixing solution C2. The transparent mixing solution C2 was baked at a temperature of 145° C. to form an initial product of powder. Then, the initial product was heated at a temperature of 550° C. for 20 minutes in a hydrogen environment of 10 vol % to perform a reduction reaction to form a heat shielding powdered product P2 with a mole ratio of Cs:W:Cl=0.33:1:0.05.

The heat shielding powdered product P2 of the Example 2 was measured by a X-ray photoelectron spectrometer (XPS) and the result shows the heat shielding powdered product P2 of the Example 2 had a mole ratio of Cs:W:Cl=0.33:1:0.05 having chlorine doping, wherein the chlorine doping level was about 0.81 mole % based on the tungsten doping amount.

Next, the heat shielding powdered product P2 was added to a solvent of toluene to provide a 10 weight percent solution, followed by the addition of a 40 weight percent of a polymeric dispersant, based on the weight of the heat shielding powdered product P2. The resulting mixture was ball milled by yttrium-stabilized $ZrO_2$ balls (diameter 2 mm) to produce a nanometer scale dispersed suspension D2. Then, the dispersed suspension D2 was added to acrylic resin (product number of ACRYDIC A-0157 by Lidye Chemical Co., Ltd.) an thoroughly mixed to provide a 30 weight percent coating solution E2. The coating solution E2 was then coated on a glass plate by a wet coating method and baked at 80° C. for a half hour to provide a 30 μm-thick transparent heat shielding film. The UV-VIS-IR spectrum of the transparent heat shielding film was measured and the results are shown in FIG. 1, FIG. 2 and Table 1. The transparent heat shielding film of the Example 2 exhibited a heat shielding index ((Tvis+Rir)*100) of 161.

Example 3

Fabricating a Heat Shielding Material with a Mole Ratio of Cs:W:Cl=0.33:1:0.20 and a Transparent Heat Shielding Film Thereof Ammonium metatungstate (produced by SHOWA company) of 10 g was added to water to provide a 30 weight percent solution and was thoroughly mixed to provide a transparent solution A3. Ammonium chloride (produced by SHOWA company) of 0.44 g was added to the transparent solution A3 and was thoroughly mixed to provide a transparent solution A31'. Cesium carbonate (produced by Alfa aesar company) of 2.2 g was added to water to provide a 50 weight percent solution and was thoroughly mixed to provide a transparent solution B3. Then, the transparent solution B3 was slowly dripped into the transparent solution A3' while stirring the transparent solution A3' at the same time to form a transparent mixing solution C3. The transparent mixing solution C3 was baked at a temperature of 145° C. to form an initial product of powder. Then, the initial product was heated at a temperature of 550° C. for 20 minutes in a hydrogen environment of 10 vol % to perform a reduction reaction to form a heat shielding powdered product P1 with a mole ratio of Cs:W:Cl=0.33:1:0.03.

The heat shielding powdered product P3 of the Example 3 was measured by a X-ray photoelectron spectrometer (XPS) and the result shows the heat shielding powdered product P3 of the Example 3 having chlorine doping, at about 1.17 mole % based on the tungsten doping amount.

Next, the heat shielding powdered product P3 was added to a solvent of toluene to provide a 10 weight percent solution, followed by addition of a 40 weight percent of a polymeric dispersant, based on the weight of the heat shielding powdered product P3. The resulting mixture was ball milled by yttrium-stabilized $ZrO_2$ balls (diameter 2 mm) to produce a nanometer scale dispersed suspension D3. Then, the dispersed suspension D3 was added to acrylic resin (product number of ACRYDIC A-0157 by Lidye Chemical Co., Ltd.) an thoroughly mixed to provide a 30 weight percent coating solution E3. The coating solution E3 was then coated on a glass plate by a wet coating method, baked at 80° C. for a half hour to provide a 30 μm-thick transparent heat shielding film. The UV-VIS-IR spectrum of the transparent heat shielding film was measured and the results are shown in Table 1. The transparent heat shielding film of the Example 3 exhibited a heat shielding index ((Tvis+Rir)*100) of 156.

Example 4

Fabricating a Heat Shielding Material with a Mole Ratio of Cs:W:Cl=0.33:1:0.30 and a Transparent Heat Shielding Film Thereof Ammonium metatungstate (produced by SHOWA company) of 10 g was added to water to provide a 30 weight percent solution and was thoroughly mixed to provide a transparent solution A4. Ammonium chloride (produced by SHOWA company) of 0.66 g was added to the transparent solution A4, and thoroughly mixed to provide a transparent solution A4'. Cesium carbonate (produced by Alfa Aesar company) of 2.2 g was added to water to provide a 50 weight percent solution and was thoroughly mixed to provide a transparent solution B4. Then, the transparent solution B4 was slowly dripped into the transparent solution A4', while stirring the transparent solution A4' at the same time to form a transparent mixing solution C4. The transparent mixing solution C4 was baked at a temperature of 145° C. to form an initial product of powder. Then, the initial product was heated at a temperature of 550° C. for 20 minutes in a hydrogen environment of 10 vol % to perform a reduction reaction to form a heat shielding powdered product P4 with a mole ratio of Cs:W:Cl=0.33:1:0.30.

The heat shielding powdered product P4 of the Example 4 was measured by an X-ray photoelectron spectrometer (XPS) and the result shows the heat shielding powdered product P4 of the Example 4 having chlorine doping, at about 5.39 mole % based on the tungsten doping amount.

Next, the heat shielding powdered product P4 was added to a solvent of toluene to provide a 10 weight percent solution, followed by addition of a 40 weight percent of a polymeric dispersant, based on the weight of the heat shielding powdered product P4. The resulting mixture was ball milled by yttrium-stabilized $ZrO_2$ balls (diameter 2 mm) to produce a nanometer scale dispersed suspension D4. Then, the dispersed suspension D4 was added to acrylic resin (product number of ACRYDIC A-0157 by Lidye Chemical Co., Ltd.) and thoroughly mixed to provide a 30 weight percent coating solution E4. The coating solution E4 was then coated on a glass plate by a wet coating method, baked at 80° C. for a half hour to provide a 30 μm-thick transparent heat shielding film. The UV-VIS-IR spectrum of the transparent heat shielding film was measured and the results are shown in FIG. 1 and Table 1. The transparent heat shielding film of the Example 4 exhibited a heat shielding index ((Tvis+Rir)*100) of 159.

Example 5

Fabricating a Heat Shielding Material with a Mole Ratio of Cs:W:Cl=0.33:1:0.50 and a Transparent Heat Shielding Film Thereof Ammonium metatungstate (produced by SHOWA company) of 10 g was added to water to provide a 30 weight percent solution and was thoroughly mixed to provide a transparent solution A5. Ammonium chloride (produced by SHOWA company) of 1.11 g was added to the transparent solution A5, and thoroughly mixed to provide a transparent solution A5'. Cesium carbonate (produced by Alfa Aesar company) of 2.2 g was added to water to provide a 50 weight percent solution and was thoroughly mixed to provide a transparent solution B5. Then, the transparent solution B5 was slowly dripped into the transparent solution A5' while stirring the transparent solution A5' at the same time to form a transparent mixing solution C5. The transparent mixing solution C5 was baked at a temperature of 145° C. to form an initial powder product. Then, the initial product was heated at a temperature of 550° C. for 20 minutes in a hydrogen environment of 10 vol % to perform a reduction reaction to form a heat shielding powdered product P5 with a mole ratio of Cs:W:Cl=0.33:1:0.50.

Next, the heat shielding powdered product P5 was added to a solvent of toluene to provide a 10 weight percent solution, followed by the addition of a 40 weight percent of a polymeric dispersant, based on the weight of the heat shielding powdered product P5. The resulting mixture was ball milled by yttrium-stabilized $ZrO_2$ balls (diameter 2 mm) to produce a nanometer scale dispersed suspension D5. Then, the dispersed suspension D5 was added to acrylic resin (product number of ACRYDIC A-0157 by Lidye Chemical Co., Ltd.) and thoroughly mixed to provide a 30 weight percent coating solution E5. The coating solution E5 was then coated on a glass plate by a wet coating method, baked at 80° C. for a half hour to provide a 30 μm-thick transparent heat shielding film. The UV-VIS-IR spectrum of the transparent heat shielding film was measured and the results are shown in Table 1. The transparent heat shielding film of the Example 5 exhibited a heat shielding index ((Tvis+Rir)*100) of 152.

Example 6

Fabricating a Heat Shielding Material with a Mole Ratio of Cs:W:Br=0.33:1:0.05 and a Transparent Heat Shielding Film Thereof Ammonium metatungstate (produced by SHOWA company) of 10 g was added to water to provide a 30 weight percent solution and was thoroughly mixed to provide a transparent solution A6. Ammonium bromide of 0.13 g was added to the transparent solution A6, and thoroughly mixed to provide a transparent solution A6'. Cesium carbonate (produced by Alfa Aesar company) of 2.2 g was added to water to provide a 50 weight percent solution and was thoroughly mixed to provide a transparent solution B6. Then, the transparent solution B6 was slowly dripped into the transparent solution A6' while stirring the transparent solution A6' at the same time to form a transparent mixing solution C6. The transparent mixing solution C6 was baked at a temperature of 145° C. to form an initial product of powder. Then, the initial product was heated at a temperature of 550° C. for 20 minutes in a hydrogen environment of 10 vol % to perform a reduction reaction to form a heat shielding powdered product P6 with a mole ratio of Cs:W:Br=0.33:1:0.05.

Next, the heat shielding powdered product P6 was added to a solvent of toluene to provide a 10 weight percent solution, followed by addition of a 40 weight percent of a polymeric dispersant, based on the weight of the heat shielding powdered product P6. The resulting mixture was ball milled by yttrium-stabilized $ZrO_2$ balls (diameter 2 mm) to produce a nanometer scale dispersed suspension D6. Then, the dispersed suspension D6 was added to acrylic resin (product number of ACRYDIC A-0157 by Lidye Chemical Co., Ltd.) and thoroughly mixed to provide a 30 weight percent coating solution E6. The coating solution E6 was then coated on a glass plate by a wet coating method, baked at 80° C. for a half hour to provide a 30 μm-thick transparent heat shielding film. The UV-VIS-IR spectrum of the transparent heat shielding film was measured and the results are shown in FIG. 2 and Table 1. The transparent heat shielding film of the Example 6 exhibited a heat shielding index ((Tvis+Rir)*100) of 159.

Example 7

Fabricating a Heat Shielding Material with a Mole Ratio of Cs:W:F=0.33:1:0.05 and a Transparent Heat Shielding Film Thereof Ammonium metatungstate (produced by SHOWA company) of 10 g was added to water to provide a 30 weight percent solution and was thoroughly mixed to provide a transparent solution A7. Ammonium fluoride of 0.053 g was added to the transparent solution A7, and thoroughly mixed to provide a transparent solution A7'. Cesium carbonate (produced by Alfa Aesar company) of 2.2 g was added to water to provide a 50 weight percent solution and was thoroughly mixed to provide a transparent solution B7. Then, the transparent solution B7 was slowly dripped into the transparent solution A7' while stirring the transparent solution A7' at the same time to form a transparent mixing solution C7. The transparent mixing solution C7 was baked at a temperature of 145° C. to form an initial product of powder. Then, the initial product was heated at a temperature of 550° C. for 20 minutes in a hydrogen environment of 10 vol % to perform a reduction reaction to form a heat shielding powdered product P7 with a mole ratio of Cs:W:F=0.33:1:0.05.

Next, the heat shielding powdered product P7 was added to a solvent of toluene to provide a 10 weight percent solution, followed by addition of a 40 weight percent of a polymeric dispersant, based on the weight of the heat shielding powdered product P7. The resulting mixture was ball milled by yttrium-stabilized $ZrO_2$ balls (diameter 2 mm) to produce a nanometer scale dispersed suspension D7. Then, the dispersed suspension D7 was added to acrylic resin (product number of ACRYDIC A-0157 by Lidye Chemical Co., Ltd.) and thoroughly mixed to provide a 30 weight percent coating solution E7. The coating solution E7 was then coated on a glass plate by a wet coating method, baked at 80° C. for a half hour to provide a 30 μm-thick transparent heat shielding film. The UV-VIS-IR spectrum of the transparent heat shielding film was measured and the results are shown in FIG. 2 and Table 1. The transparent heat shielding film of the Example 7 exhibited a heat shielding index ((Tvis+Rir)*100) of 152.

Comparative Example 2

Fabricating a Heat Shielding Material with a Mole Ratio of Rb:W=0.33:1 and a Transparent Heat Shielding Film Thereof Ammonium metatungstate of 10 g was added to water to provide a 30 weight percent solution and was thoroughly mixed to provide a transparent solution F. Rubidium carbonate of 1.5 g was added to water to provide a 50 weight percent solution and was thoroughly mixed to provide a transparent solution G. Then, the transparent solution G was slowly dripped into the transparent solution F while stirring the transparent solution F at the same time to form a transparent mixing solution H. The transparent mixing solution H was baked at a temperature of 145° C. to form an initial product of powder. Then, the initial product was heated at a temperature of 550° C. for 20 minutes in a hydrogen environment of 10 percent by volume (vol %) to perform a reduction reaction to form a heat shielding powdered product Q with a mole ratio of Rb:W=0.33:1. Next, the heat shielding powdered product Q was added to a solvent of toluene to provide a 10 weight percent solution, followed by addition of a 40 weight percent of a polymeric dispersant, based on the weight of the heat shielding powdered product Q. The resulting mixture was ball milled by yttrium-stabilized $ZrO_2$ balls (diameter 2 mm) to produce a nanometer scale dispersed suspension I. Then, the dispersed suspension I was added to acrylic resin (product number of ACRYDIC A-0157 by Lidye Chemical Co., Ltd.) and thoroughly mixed to provide a 30 weight percent coating solution J. The coating solution J was then coated on a glass plate by a wet coating method, baked at 80° C. for a half hour to provide a 30 μm-thick transparent heat shielding film. The ultraviolet-visible-infrared light (UV-VIS-IR) spectrum of the transparent heat shielding film was measured and the results are shown in Table 1. The transparent heat shielding film of the Comparative Example 2 exhibited a heat shielding index ((Tvis+Rir)*100) of 149.

Example 8

Fabricating a Heat Shielding Material with a Mole Ratio of Rb:W:Cl=0.33:1:0.05 and a Transparent Heat Shielding Film Thereof Ammonium metatungstate of 10 g was added to water to provide a 30 weight percent solution and was thoroughly mixed to provide a transparent solution F1. Ammonium chloride of 0.11 g was added to the transparent solution F1, an thoroughly mixed to provide a transparent solution F1'. Rubidium carbonate of 1.5 g was added to water to provide a 50 weight percent solution and was thoroughly mixed to provide a transparent solution G1. Then, the transparent solution G1 was slowly dripped into the transparent solution F1' while stirring the transparent solution F1' at the same time to form a transparent mixing solution H1. The transparent mixing solution H1 was baked at a temperature of 145° C. to form an initial product of powder. Then, the initial product was heated at a temperature of 550° C. for 20 minutes in a hydrogen environment of 10 vol % to perform a reduction reaction to form a heat shielding powdered product Q1 with a mole ratio of Rb:W:Cl=0.33:1:0.05. Next, the heat shielding powdered product Q1 was added to a solvent of toluene to provide a 10 weight percent solution, followed by addition of a 40 weight percent of a polymeric dispersant, based on the weight of the heat shielding powdered product Q1. The resulting mixture was ball milled by yttrium-stabilized $ZrO_2$ balls (diameter 2 mm) to produce a nanometer scale dispersed suspension I1. Then, the dispersed suspension I1 was added to acrylic resin (product number of ACRYDIC A-0157 by Lidye Chemical Co., Ltd.), and thoroughly mixed to provide a 30 weight percent coating solution J1. The coating solution J1 was then coated on a glass plate by a wet coating method, baked at 80° C. for a half hour to provide a 30 μm-thick transparent heat shielding film. The UV-VIS-IR spectrum of the transparent heat shielding film was measured and the results are shown in Table 1. The transparent heat shielding film of the Example 8 exhibited a heat shielding index ((Tvis+Rir)*100) of 152.

Table 1 displays the characters of the transparent heat shielding films of Examples 1-8 and Comparative Examples 1-2

| transparent heat shielding film | Visible light transmission (%); Tvis | Infrared light shielding ratio (%); Rir | heat shielding index (Tvis + Rir)*100 |
|---|---|---|---|
| Comparative Example 1 | 74 | 77 | 151 |
| Example 1 | 71 | 89 | 160 |
| Example 2 | 71 | 90 | 161 |
| Example 3 | 64 | 92 | 156 |
| Example 4 | 66 | 93 | 159 |
| Example 5 | 58 | 94 | 152 |
| Example 6 | 67 | 92 | 159 |
| Example 7 | 69 | 83 | 152 |
| Comparative Example 2 | 71 | 78 | 149 |
| Example 8 | 72 | 80 | 152 |

As shown in the results of Table 1, while comparing Examples 1-4 with Comparative Example 1 and Example 8 with Comparative Example 2, the transparent heat shielding films containing the heat shielding materials of tungsten oxide powder with alkali metal and halogen co-doping therein have heat shielding indexes higher than that of the transparent heat shielding films containing tungsten oxide powder with only alkali metal doping therein.

Further, as shown in the results of Table 1, while comparing Example 2 with Example 7, the transparent heat shielding films containing the heat shielding material of tungsten oxide powder with alkali metal and chlorine co-doping therein has a heat shielding index higher than that of the transparent heat shielding film containing tungsten oxide powder with alkali metal and fluorine co-doping therein. While comparing Example 2 with Example 6, the transparent heat shielding films containing the heat shielding material of tungsten oxide powder with alkali metal and chlorine co-doping therein have substantially the same heat shielding index as that of the transparent heat shielding film containing tungsten oxide powder with alkali metal and bromine co-doping therein.

As mentioned above, the embodiments of the invention provide a transparent heat shielding material represented by $M_xWO_{3-y}A_y$, which is tungsten oxide with alkali metal and halogen co-doping. The transparent heat shielding films formed from the transparent heat shielding materials $M_xWO_{3-y}A_y$ have both high visible light transmission and high infrared light shielding ability. Moreover, the transparent heat shielding films can be formed by wet coating methods with low fabrication cost.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transparent heat shielding material, comprising tungsten oxide having at least one alkali metal and halogen co-doping, represented by Formula (I):

$$M_xWO_{3-y}A_y \quad \text{Formula (I),}$$

wherein M is at least one alkali metal element, W is tungsten, O is oxygen, A is halogen element, $0<x\leq1$, and $0<y\leq0.5$.

2. The transparent heat shielding material as claimed in claim 1, wherein M is selected from the group consisting of lithium (Li), sodium (Na), potassium (K), rubidium (Rb) and cesium (Cs).

3. The transparent heat shielding material as claimed in claim 1, wherein A is selected from the group consisting of fluorine (F), chlorine (Cl), bromine (Br) and iodine (I).

4. The transparent heat shielding material as claimed in claim 1, having a plasma wavelength of 800 nm to 1000 nm.

5. The transparent heat shielding material as claimed in claim 1, further comprising one or more than one oxide covering the tungsten oxide $M_xWO_{3-y}A_y$, wherein the oxide is selected from the group consisting of silicon oxide, zirconium oxide, titanium oxide and aluminum oxide.

6. The transparent heat shielding material as claimed in claim 1, further comprising silane or an organic-metal functional group covering the tungsten oxide of $M_xWO_{3-y}A_y$.

7. A method for forming a transparent heat shielding material, comprising:
providing a precursor for forming tungsten oxide;
providing a halogen salt and an alkali metal salt for mixing with the precursor for forming tungsten oxide to form a mixture, wherein the halogen salt has a halogen anion and the alkali metal salt has at least one alkali metal cation; and
performing a reduction reaction to the mixture in a hydrogen environment to form tungsten oxide having at least one alkali metal cation and the halogen anion co-doping, represented by Formula (I):

$$M_xWO_{3-y}A_y \quad \text{Formula (I),}$$

wherein M is the at least one alkali metal element, W is tungsten, O is oxygen, A is halogen element, $0<x\leq1$, and $0<y\leq0.5$.

8. The method as claimed in claim 7, wherein the precursor for forming tungsten oxide is selected from the group consisting of ammonium metatungstate, ammonium orthotungstate, ammonium paratungstate, alkali metal tungstate, tungstic acid, tungsten silicide, tungsten sulfide, tungsten oxychloride, tungsten alkoxide, tungsten hexachloride, tungsten tetrachloride, tungsten bromide, tungsten fluoride, tungsten carbide and tungsten oxycarbide.

9. The method as claimed in claim 7, wherein the alkali metal salt is represented by a formula of $M_pN$, and wherein M is an alkali metal element selected from the group consisting of lithium (Li), sodium (Na), potassium (K), rubidium (Rb) and cesium (Cs), N is an anion or an anion group with negative valence, and $1\leq p\leq12$.

10. The method as claimed in claim 9, wherein the alkali metal salt is selected from the group consisting of alkali metal carbonate, alkali metal hydrogen carbonate, alkali metal nitrate, alkali metal nitrite, alkali metal hydroxide, alkali metal halide, alkali metal sulfate and alkali metal sulfite.

11. The method as claimed in claim 7, wherein the halogen salt is represented by a formula of $PA_q$, and wherein A is halogen element selected from the group consisting of fluorine (F), chlorine (Cl), bromine (Br) and iodine (I), P is a cation or a cation group with positive valence, and $1\leq q\leq12$.

12. The method as claimed in claim 11, wherein the halogen salt is selected from the group consisting of ammonium halide, alkylammonium salt, halocarbon, hydrogen halide, tungsten halide, benzene halide, halogenated aromatic and alkyl halide.

13. The method as claimed in claim 7, wherein the step of mixing precursor for forming tungsten oxide, the alkali metal salt and the halogen salt is performed in a liquid system or a solid system.

14. The method as claimed in claim 13, wherein in the liquid system, before the step of performing the reduction reaction, further comprises heating the mixture to remove a solvent therein.

15. The method as claimed in claim 7, wherein the reduction reaction is performed at a temperature between 300° C. and 800° C.

16. The method as claimed in claim 7, wherein the halogen in the material $M_xWO_{3-y}A_y$ is further provided from the alkali metal salt, the precursor for forming tungsten oxide or the combination thereof.

17. The method as claimed in claim 7, wherein a doping ratio of the alkali metal cation is different from a doping ratio of the halogen anion.

18. The method as claimed in claim 7, wherein a doping ratio of the alkali metal cation is the same as a doping ratio of the halogen anion.

19. The method as claimed in claim 7, further comprising performing a milling process to the material $M_xWO_{3-y}A_y$ to form a powder of $M_xWO_{3-y}A_y$ having a diameter less than 100 nm.

20. A transparent heat shielding structure, comprising:
one or more than one layer of a transparent heat shielding film, wherein the transparent heat shielding film includes a tungsten oxide having at least one alkali metal and halogen co-doping, represented by Formula (I):

$$M_xWO_{3-y}A_y \qquad \text{Formula (I)},$$

wherein M is the at least one alkali metal element, W is tungsten, O is oxygen, A is halogen element, $0<x\leqq1$, and $0<y\leqq0.5$.

21. The transparent heat shielding structure as claimed in claim 20, wherein the layers of the transparent heat shielding films have different compositions of the material $M_xWO_{3-y}A_y$.

22. The transparent heat shielding structure as claimed in claim 20, wherein the transparent heat shielding film further comprises a binder and the material $M_xWO_{3-y}A_y$ is dispersed in the binder.

23. The transparent heat shielding structure as claimed in claim 22, wherein the material $M_xWO_{3-y}A_y$ is 1 to 99 percent by weight in the transparent heat shielding film.

24. The transparent heat shielding structure as claimed in claim 22, wherein the binder comprises an organic binder, an inorganic binder or a pressure sensitive adhesive.

25. The transparent heat shielding structure as claimed in claim 20, wherein the transparent heat shielding film has a thickness of 1 μm to 100 μm.

* * * * *